US012687945B1

(12) United States Patent (10) Patent No.: US 12,687,945 B1

Luo (45) Date of Patent: Jul. 21, 2026

(54) STYLUS SYSTEM WITH PROXIMITY-BASED DISPLAY ACTIVATION

(71) Applicant: Amazon Technologies, Inc., Seattle, WA (US)

(72) Inventor: Junwu Luo, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/277,134

(22) Filed: Jul. 22, 2025

(51) Int. Cl.
  *G06F 3/041* (2006.01)
  *G06F 3/0354* (2013.01)

(52) U.S. Cl.
  CPC ...... G06F 3/04162 (2019.05); G06F 3/03545 (2013.01); *G06F 2203/04108* (2013.01)

(58) Field of Classification Search
  CPC ............. G06F 3/04162; G06F 3/03545; G06F 2203/04108
  USPC ......................................... 345/173
  See application file for complete search history.

(56) References Cited

U.S. PATENT DOCUMENTS

| | | | | |
|---|---|---|---|---|
| 2010/0134437 A1* | 6/2010 | Yang | ...................... | G06F 1/3203 |
| | | | | 345/169 |
| 2015/0138101 A1* | 5/2015 | Park | ......................... | G06F 21/31 |
| | | | | 345/173 |
| 2015/0309599 A1* | 10/2015 | Michihata | ............. | G06F 1/3259 |
| | | | | 345/174 |
| 2015/0363012 A1* | 12/2015 | Sundara-Rajan | ..... | G06F 3/0441 |
| | | | | 345/179 |
| 2016/0299583 A1* | 10/2016 | Watanabe | ............... | G06F 3/041 |
| 2020/0356210 A1* | 11/2020 | Stone | .................... | G06F 3/0418 |
| 2021/0271306 A1* | 9/2021 | Heo | ...................... | G06F 1/3234 |

* cited by examiner

*Primary Examiner* — Nathan P Brittingham

(74) *Attorney, Agent, or Firm* — K&L Gates LLP

(57) ABSTRACT

A method of power-saving and/or proximity-based auto-waking of a mobile device and/or an input device or stylus includes determining, by a mobile device, that motion of an input device has occurred. The method further includes sending, based on the determining of the motion of the input device, a power-on signal to a touch controller circuit and sending a wireless connection beacon using a short-range wireless communication protocol. The method includes receiving acknowledgement data responsive to the wireless connection beacon from the input device and sending, in an instance where a central processing unit (CPU) is in a low-power state, a power-on signal to the CPU. The method further includes receiving, using the short-range wireless communication protocol, input data associated with an interaction of the input device with a display of the mobile device.

20 Claims, 7 Drawing Sheets

/ 300

Determining, by a mobile device, that motion of an input device has occurred / 305

Sending, based on the determining of the motion of the input device, a power-on signal to a touch controller circuit / 310

Sending a wireless connection beacon using a short-range wireless communication protocol / 315

Receiving acknowledgement data responsive to the wireless connection beacon from the input device / 320

Sending, based on the acknowledgement data, in an instance where a central processing unit (CPU) is in a sleep state, a power-on signal to a central processing unit (the CPU) of the mobile device / 325

Receiving, using the short-range wireless communication protocol, first input data associated with an interaction of the input device with a display of the mobile device / 330

150 hand

105

110

105

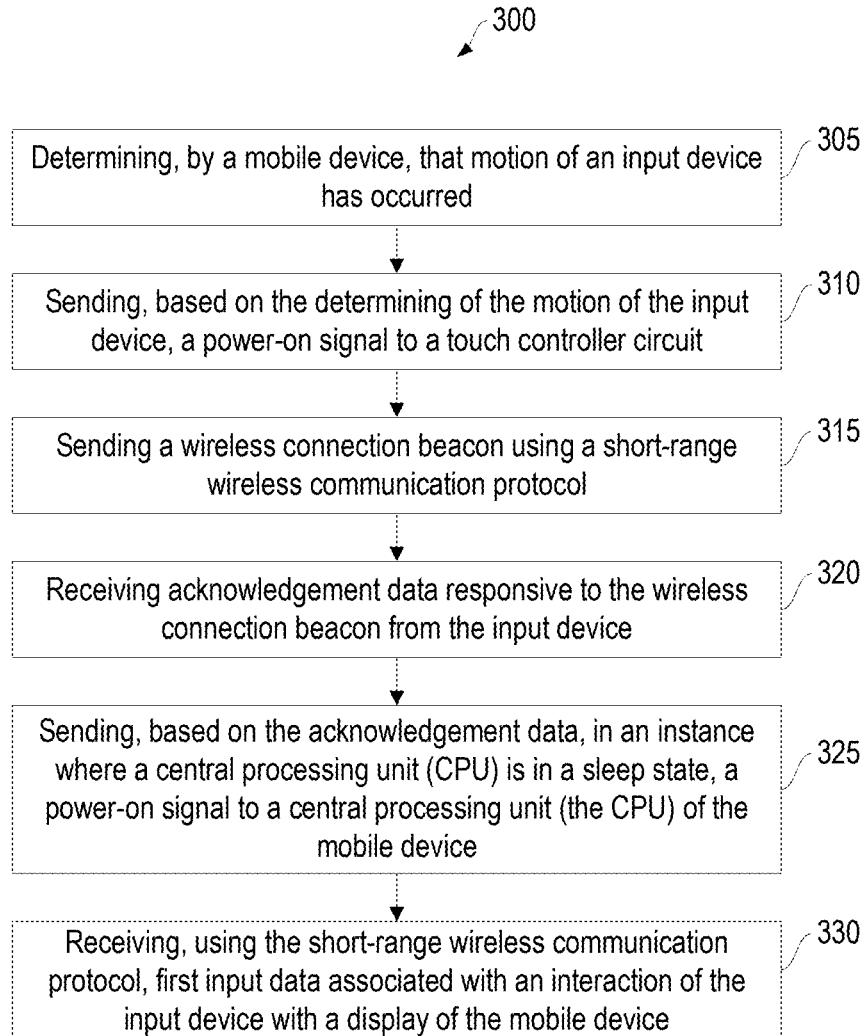

300

Determining, by a mobile device, that motion of an input device has occurred    305

Sending, based on the determining of the motion of the input device, a power-on signal to a touch controller circuit    310

Sending a wireless connection beacon using a short-range wireless communication protocol    315

Receiving acknowledgement data responsive to the wireless connection beacon from the input device    320

Sending, based on the acknowledgement data, in an instance where a central processing unit (CPU) is in a sleep state, a power-on signal to a central processing unit (the CPU) of the mobile device    325

Receiving, using the short-range wireless communication protocol, first input data associated with an interaction of the input device with a display of the mobile device    330

FIG. 3

STYLUS SYSTEM WITH PROXIMITY-BASED DISPLAY ACTIVATION

BACKGROUND

Modern mobile devices and digital displays often include a touch-sensitive capability, allowing user input from touch gestures or via a stylus, for example. A touch-sensitive display may be a liquid crystal display, a light-emitting diode display, an electrophoretic display, a cathode ray tube, or one of various other display types. Mobile devices also include various power-saving and auto-wake features.

BRIEF DESCRIPTION OF DRAWINGS

FIG. 3 depicts a method of power saving of a stylus and a mobile device in accordance with various aspects of the present disclosure.

DETAILED DESCRIPTION

Figure 1B:
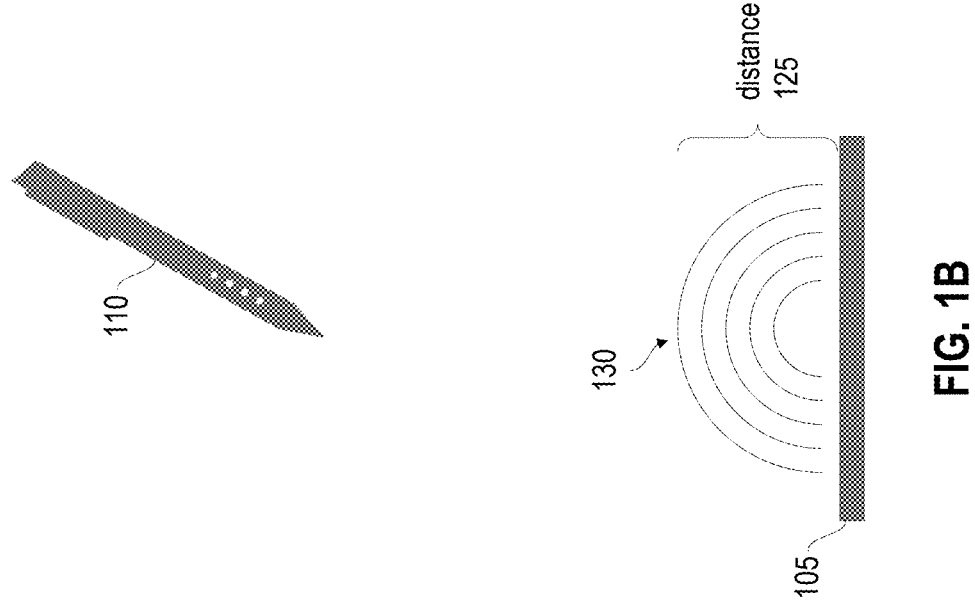
FIG. 1B depicts a transmitting of short-range connection beacons by the mobile device in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Multi-purpose, mobile devices often utilize digital displays with a touch-sensitive capability to accept complex user input provided directly on displayed content. Displays or devices with a touch-sensitive capability may accept continuous position data from a stylus, finger, or other pointing object as it moves across an outer surface of a display. Displays of any variety that are able to accept such touch and/or stylus inputs may be referred to herein as touchscreen displays or touch-sensitive displays. Sampling rate, accuracy, and/or precision in such devices are selected to capture handwritten text. However, an active stylus (e.g., a stylus with a power source, such as a battery) may require an established, short-range, wireless communications channel between itself and a mobile device to communicate position data or motion data. Maintaining a wireless communications channel suitable for communicating position data may require a substantial power consumption both by the mobile device and/or the stylus, and/or may require that various components of the mobile device remain in an active, powered-on working state rather than a low-power state and/or a sleep state.

In many examples, various methods disclosed herein, including a method of power-saving and/or proximity-based auto-waking of a mobile device and/or a stylus, reduce a power consumption of a stylus and/or a mobile device when the stylus is not providing position and/or motion data, and/or when the stylus is at a distance from the mobile device that prevents the establishment or maintenance of a short-range wireless communications channel. Furthermore, various methods disclosed herein allow the mobile device or various components thereof to enter a low-power state and/or a sleep state in an instance where the stylus is not providing position data and/or is at a distance from the mobile device that prevents the establishment or maintenance of a short-range wireless communications channel. Various example methods disclosed herein may include establishing a Bluetooth (BT), Bluetooth Low Energy (BTLE) or other low-power, intermediate-range communications channel between a stylus and a mobile device to send motion data from the stylus to the mobile device. Such motion data does not communicate user input information, but rather an indication that a stylus has been moved and/or is currently moving, possibly by a user with an intent to bring the stylus into proximity or contact with the mobile device to interact with the mobile device, to provide position data to the mobile device, and/or to provide user input information to the mobile device. Various example methods disclosed herein may include various filtering or timeout operations to determine if motion of the stylus constitutes a user intention to interact with the mobile device. Some example methods disclosed herein permit independent circuitry, modules, and/or subsystems of the mobile device to maintain a Bluetooth communications channel between the stylus and the mobile device while other components of the mobile device may enter or remain in a low-power state (e.g., a "sleep" state) in instances in which a user is not interacting with the mobile device. By not actively maintaining the short-range communications channel by which the stylus sends its position data to the mobile device as a means of providing user input and/or by permitting various components of the mobile device to enter a sleep state, the mobile device achieves a substantial reduction in power consumption.

Figure 1A:
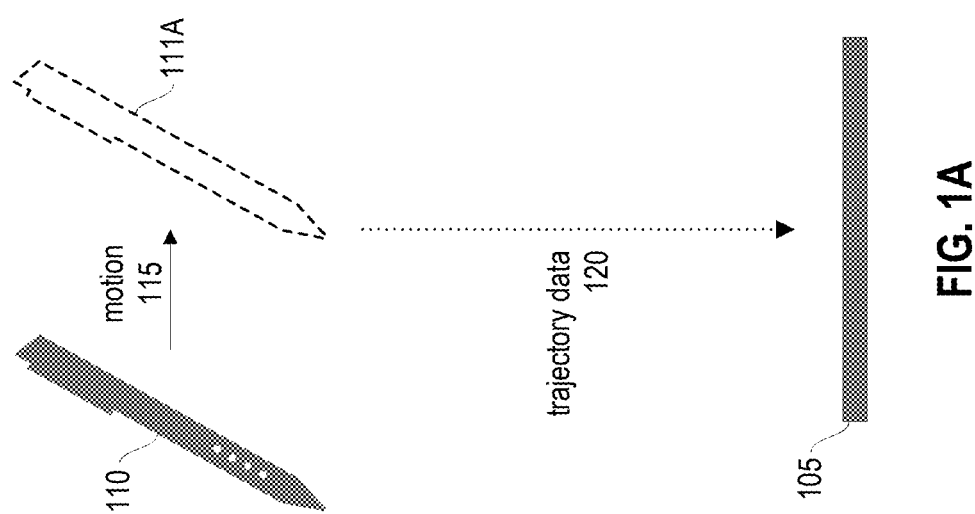
FIG. 1A depicts a motion of a stylus and a sending of motion data to a mobile device in accordance with various aspects of the present disclosure.

FIG. 1A depicts a motion of a stylus 110 and a sending of trajectory data to a mobile device 105 in accordance with various aspects of the present disclosure. In many examples, a stylus 110 in a first position communicates with a mobile device 105 through a wireless connection and/or a wireless communications channel, such as a Bluetooth connection or a Bluetooth communications channel. In some examples, the Bluetooth connection may be a Bluetooth Low Energy (BTLE) connection. In an instance where the stylus 110 undergoes motion 115 to a second position 111A, the stylus may send trajectory data 120 to the mobile device 105 via the Bluetooth connection. In some examples, trajectory data 120 may be acceleration data or a set of samples of a trajectory of the stylus. In other examples, trajectory data 120 may be a notification that motion has occurred or may have occurred. Motion or a trajectory of the stylus may be measured by an inertial measurement unit (IMU), an accelerometer, a magnetometer, and/or a gyroscope, for example. The mobile device 105 or various components thereof, based on the trajectory data, determine that the stylus has moved and may wake various components of the mobile device that are in a sleep state or a low-power state. Waking, in this context, may refer to transitioning a component of mobile device 105 from a lower-power state (e.g., an OFF state or other low-power state (e.g., a sleep state)) to a higher-power state (e.g., an ON state, such as an active state). In some examples, responsive to trajectory data, the mobile device 105 may wake a touch controller on the mobile device 105.

FIG. 1B depicts a transmitting of short-range wireless connection beacons by the mobile device 105 in accordance with various aspects of the present disclosure. In some examples, a touch controller on the mobile device 105 may transmit short-range wireless connection beacons. In an instance where the stylus 110 moves and sends trajectory data to the mobile device 105, the mobile device 105 may, based on the trajectory data, begin broadcasting (e.g. transmitting) short-range wireless connection beacons 130. In some examples, the short-range wireless connection beacons may have a range 125 of about 10 cm (although the range may depend on the short-range wireless communication radio and/or protocol being used). A short-range wireless communication protocol corresponding to the connection beacons may operate at a lower latency than a Bluetooth connection and so that user inputs may be detected by the mobile device 105 with minimal latency (sometimes referred to as "lag" in this context). In many examples, the stylus may send a response (e.g., acknowledgement data) to the short-range wireless connection beacons 130.

Figures 1C, 1D:
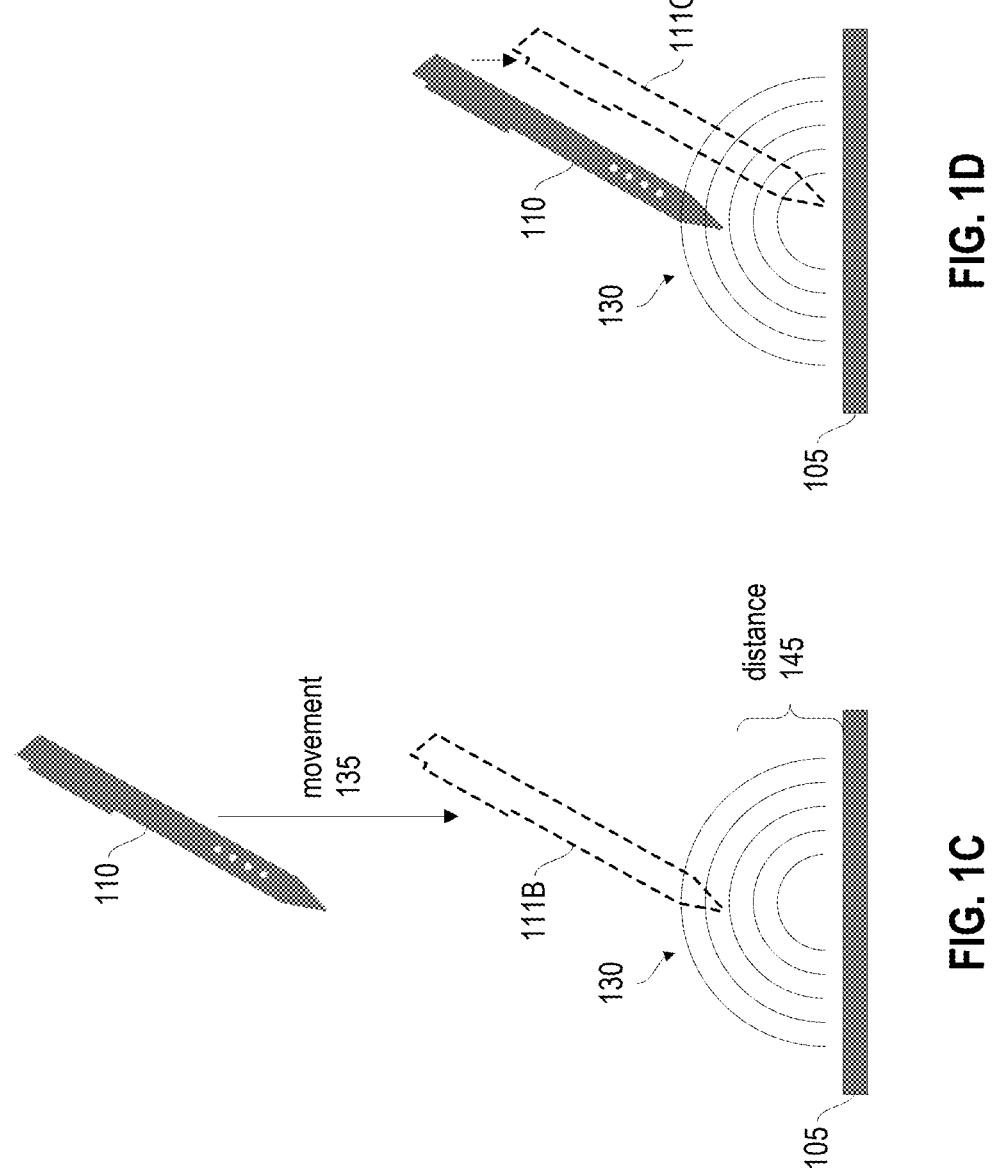
FIG. 1C depicts a movement of a stylus to within a touch downlink range of short-range connection beacons of a mobile device in accordance with various aspects of the present disclosure.
FIG. 1D depicts a movement of a stylus to within a hover distance or a contact distance of a mobile device in accordance with various aspects of the present disclosure.

FIG. 1C depicts a movement 135 of a stylus to within a touch downlink range of short-range connection beacons of mobile device 105 in accordance with various aspects of the present disclosure. To establish and/or maintain a short-range wireless communications channel, the mobile device 105 transmits short-range wireless connection beacons 130 having an uplink range or an uplink distance (which may be dependent on the short-range wireless technology being used). In some examples, the uplink distance may be about 10 cm. However, the actual uplink distance (e.g., range) may vary according to the desired implementation (e.g., according to the wireless radio and/or communication protocol being used for this purpose). A short-range wireless radio of the stylus may receive connection beacons while the stylus is within the uplink distance (e.g., while the stylus is within range). Similarly, the mobile device 105 may receive the stylus's response (e.g., acknowledgement data) to connection beacons while the stylus is within a touch downlink distance 145 (e.g., a downlink range) of the mobile device 105. A downlink distance may be a distance from the stylus 110 wherein the mobile device 105 may receive acknowledgement data but wherein a position of the stylus is not yet known. In some examples, a hover distance may be a distance at which a position of the stylus is known. FIG. 1C depicts a movement 135 of a stylus 110 to a location 111B that is within a touch downlink distance 145 of the mobile device 105. FIG. 1D depicts a movement of a stylus to a position 111C that is within a hover distance or a contact distance of a mobile device in accordance with various aspects of the present disclosure. In an instance where the stylus is within a hover distance and/or a contact distance, a user may interact with the mobile device via the stylus. A hover distance may be a distance at which the mobile device may be able to measure a distance of the stylus, or may correspond to a type of input available to a user. Upon receiving acknowledgement data responsive to connection beacons, and when the stylus is within a hover distance and/or a contact distance, a display of the mobile device may transition from an off-state, a low-power state, and/or a sleep state to an on state and/or an active state.

In many examples, the stylus is an active stylus (e.g., a powered stylus using a power supply). In some examples, the stylus may be an electromagnetic resonance (EMR) stylus. The stylus may harvest energy from a radio frequency (RF) signal from a mobile device. In other examples, the active stylus may be equipped with a battery or other power source. In some examples, the stylus and the short-range wireless communications protocol may correspond to a Universal Stylus Initiative (USI) protocol, a Microsoft Pen Protocol (MPP) protocol, an Apple Pencil Protocol (APP) protocol, or other stylus protocol.

Figure 1F:
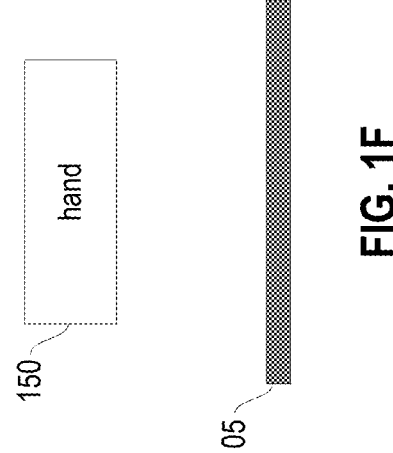
FIG. 1F depicts a stylus-free interaction between a human and or other passive device and a mobile device in accordance with various aspects of the disclosure.
Figure 1E:
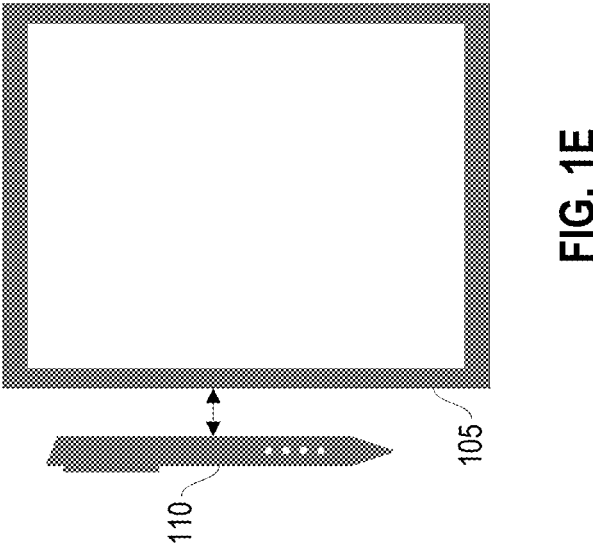
FIG. 1E depicts an attach-to-pair process wherein the stylus first establishes a Bluetooth or other intermediate-range communications channel with a mobile device in accordance with various aspects of the disclosure.

FIG. 1E depicts an attach-to-pair process wherein the stylus first establishes a Bluetooth or other intermediate-range communications channel with a mobile device in accordance with various aspects of the disclosure. In the attach-to-pair process, the stylus contacts or nearly contacts the mobile device. The mobile device and stylus may only perform the attach-to-pair process when on a first instance where the stylus contacts or nearly contacts the device. In some examples, a magnet on the stylus activates a Hall sensor on the mobile device to initiate the attach-to-pair process. The tablet may also include a wireless charging capability which may power the stylus and receive a hardware address or a media access control (MAC) address, such as a Bluetooth MAC address, of the stylus. In some examples, the attach-to-pair process may include a Bluetooth pairing process. Furthermore, in some examples, if the stylus is in an attach-to-pair position as FIG. 1E depicts and if the stylus is already paired with the mobile device, the mobile device may not transmit a short-range wireless connection beacon and/or the stylus may not send trajectory data to the mobile device.

FIG. 1F depicts a stylus-free interaction between a human and or other passive device and a mobile device in accordance with various aspects of the disclosure. In some examples, a user may not use a stylus, an attach-to-pair process may not have been completed, and/or a stylus may be outside a range of the Bluetooth communications channel. In some examples wherein a stylus is not paired with the mobile device, a user may interact with the mobile device by hand, such as with a finger or other passive device. If a stylus is not paired with the mobile device, the mobile device may not broadcast a connection beacon and/or a Bluetooth subsystem of the mobile device may remain in an off-state or a low-power state.

Figure 2:
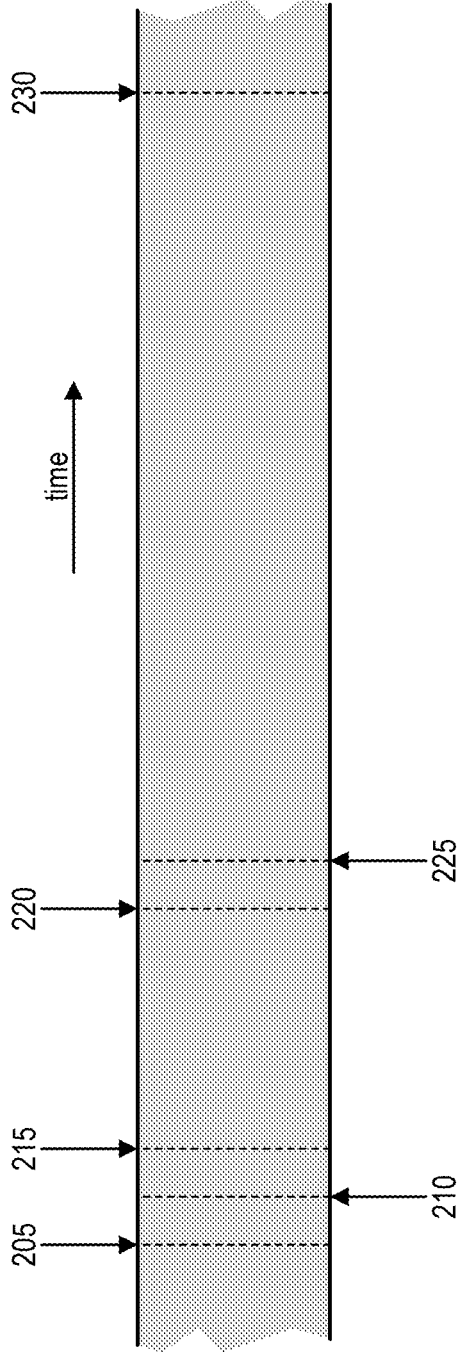
FIG. 2 depicts a timing diagram of a method of power saving of a stylus and a mobile device in accordance with various aspects of the present disclosure.

FIG. 2 depicts an example timing diagram of a method of power saving of a stylus and a mobile device in accordance with various aspects of the present disclosure. The figure depicts various events that occur in the mobile device as the method disclosed herein is performed. Under a starting condition or at an initial time 205, an input device or a stylus may be paired with a mobile device in a wireless communications channel such as a Bluetooth (BT) or Bluetooth Low Energy (BTLE) communications channel. In the starting condition or initial time, the stylus is beyond a physical distance from the mobile device to support a short-range wireless communication channel that mediates user input to the mobile device via the stylus. In other words, the stylus is out of short-range wireless communication range. In the starting condition, various components of the mobile device may be in a sleep state or other low-power state; the various components may include a central processing unit (CPU), a touch controller circuit, and/or a display. A Bluetooth controller on the mobile device may also be in a low-power state in the starting condition. In FIG. 2, the initial time 205 may be the time at which motion data associated with the stylus is received by a Bluetooth transceiver on the mobile device. At a time 210, an independent Bluetooth controller on the mobile device may receive a notification of stylus motion from the Bluetooth transceiver. At a time 215, a touch controller on the mobile device may begin broadcasting short-range wireless connection beacons, and at a time 220, the stylus may be detected by the touch controller upon receipt of acknowledgement data from the stylus responsive to the connection beacons. At a time 225, a CPU or system-on-a-chip (SoC) wake sequence may initiate, and at a time 230 after the initial time, a display on the mobile stream may activate or transition from a low-power state to a working state.

FIG. 3 depicts a method of power saving of a stylus and a mobile device in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices (e.g., of one or more processors of mobile device 105). In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

A step 305 of the process 300 may include determining by a mobile device, that motion of an input device and/or a stylus has occurred. In many examples, a Bluetooth (BT) or Bluetooth Low Energy (BTLE) communications channel exists between the input device and the mobile device. Via the BT or BTLE communications channel, the stylus may send a notification of its motion to the mobile device and/or may send motion data, trajectory data, or acceleration data to the mobile device. Acceleration data may, for example, comprise digital samples of an accelerometer in the stylus.

A step 310 of the process may include sending, based on the determining of the motion of the input device, a power-on signal to a touch controller circuit. The mobile device comprises a central processing unit (CPU) or system-on-a-chip (SoC) that performs general purpose computation for user applications, operating system functions, or other computational processes on the mobile device. The mobile device further comprises a touch controller or touch controller circuit that sends short-range wireless connection beacons to the stylus and/or processes position data from the stylus that is provided as a user manipulates a stylus in contact with or in a close vicinity of the mobile device. The mobile device further comprises a Bluetooth transceiver and a Bluetooth microcontroller unit (MCU) or Bluetooth controller. While a user is not interacting with the mobile device via the stylus, various components of the mobile device, such as the touch controller circuit, may be in a low-power state and/or a sleep state. The step 310 may include sending, based on the determining of the motion of the input device, a power-on signal to the touch controller circuit. In many examples, the Bluetooth controller sends the power-on signal to the touch controller circuit.

A step 315 of the process may include sending a wireless connection beacon using a short-range wireless communication protocol. After the step 310, the touch controller circuit is in a working state, a fully powered state, an active state, and/or a powered-on state. In a working state, the touch controller circuit sends a wireless connection beacon using a short-range wireless communication protocol to establish a short-range wireless communications channel with the stylus.

A step 320 of the process may include receiving acknowledgement data responsive to the wireless connection beacon from the input device. In an instance where the stylus is within an uplink range and/or an uplink distance of the mobile device, the input device or stylus receives the short-range wireless connection beacon from the mobile device and sends acknowledgement data responsive to the wireless connection beacon. In an instance where the input device or stylus is within a touch downlink range and/or a touch downlink distance of the mobile device, the mobile device receives the acknowledgement data. In many examples, the uplink distance may be about 10 cm and the touch downlink distance may be about 2 cm. In some examples, in an instance where the stylus is at a distance greater than the touch downlink distance of the mobile device for a timeout duration and the mobile device determines that no motion of the input device has occurred for the first timeout duration, the mobile device may cease sending a short-range connection beacon and may further transition the touch controller from a working state to a low-power state.

A step 325 of the process may include sending, based on the acknowledgement data, in an instance where a central processing unit (CPU) is in a sleep state, a power-on signal to a central processing unit (the CPU) of the mobile device. In some examples, a manual user action, such as a pressing of a power button, may send a power-on signal to the CPU of the mobile device. A pressing of a power button may send a power-on signal to a display of the mobile device, but the mobile device may remain in a locked state. In other examples, if acknowledgement data from the input device causes a power-on signal to the CPU, the mobile device may enter an unlocked state. In some examples, in an instance where no acknowledgement data is received from the input device within a timeout duration, the step 325 may further comprise sending a power-off signal to the CPU.

A step 330 of the process may include receiving, using the short-range wireless communication protocol, first input data associated with an interaction of the input device with a display of the mobile device. After a short-range wireless communications channel is established between the stylus and the mobile device, a user may interact with the mobile device using the stylus and so the CPU, which provides computational resources for user applications, is powered on. In various examples, the process may further comprise rendering by the CPU on a display of the mobile device and based on the input data, output data. Output data may include, for example, a result of a user action in a user application or a user's handwriting.

Figure 4:
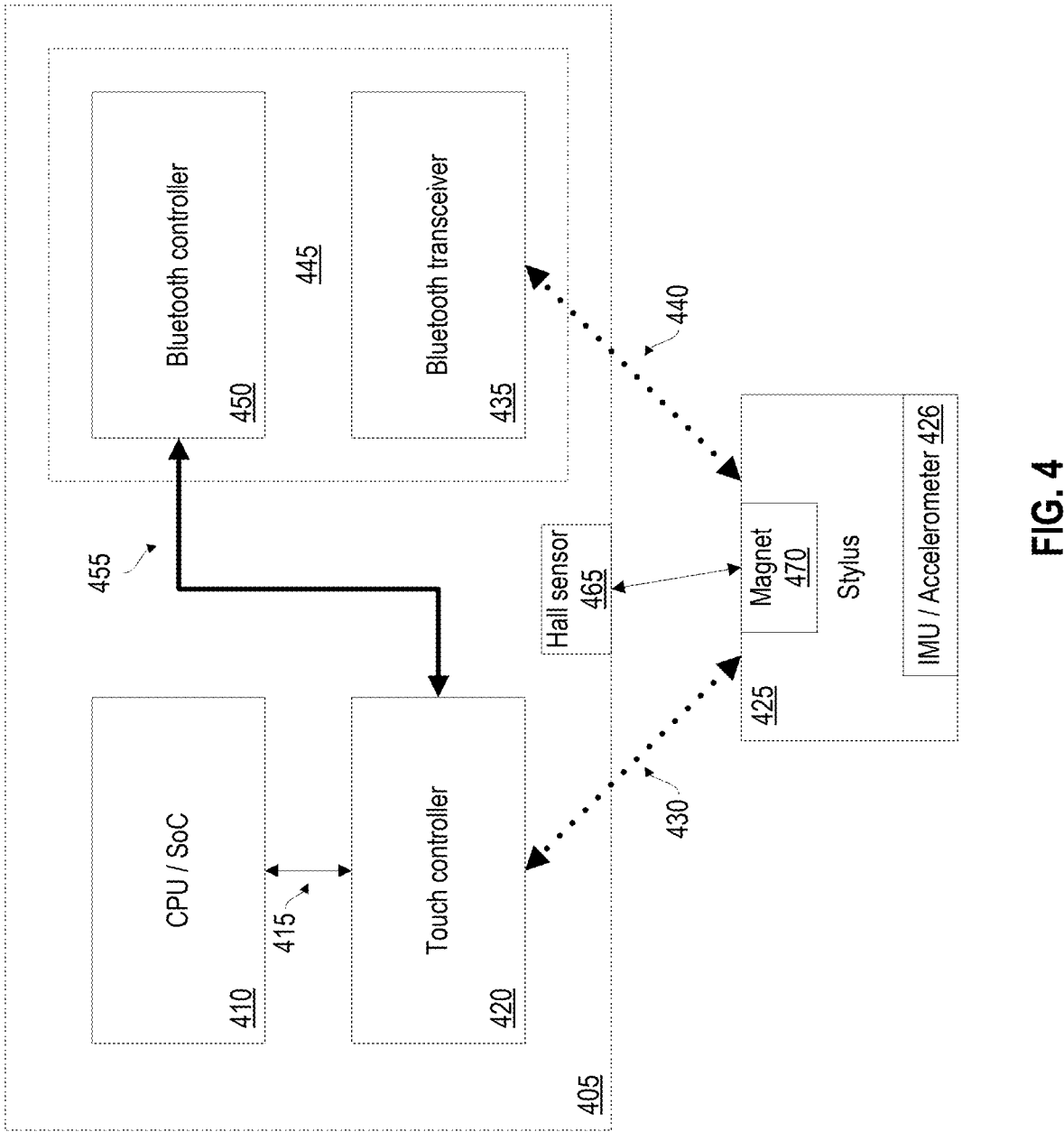
FIG. 4 depicts a block diagram of a stylus and various computational and communications components of a mobile device in accordance with various aspects of the present disclosure.

FIG. 4 depicts a block diagram of a stylus and various computational and communications components of a mobile device in accordance with various aspects of the present disclosure. A mobile device 405 includes a central processing unit (CPU) or system-on-a-chip (SoC) or primary processor 410. A CPU, SoC, or primary processor 410 may provide computational resources for user applications and/or operating system processes. An SoC may consolidate many components of a mobile device into a single integrated circuit or package, including a CPU, a memory, input and output interfaces, digital signal processing (DSP) modules, and/or graphics processing units (GPUs). A CPU or SoC may be in various working states, power-saving states, sleep states, or low-power states. A CPU or SoC includes a communications interface 415 to a touch controller 420. A touch controller interacts with a stylus 425 or other input device via a short-range wireless communications channel 430. A stylus may also interact with a Bluetooth transceiver 435 on the mobile device via a Bluetooth connection or Bluetooth communications channel 440 or other wireless communications channel. A Bluetooth circuit or Bluetooth chipset 445 includes a Bluetooth microcontroller unit (MCU) or other Bluetooth controller 450 and/or the Bluetooth transceiver 435. A stylus may include an inertial measurement unit (IMU) or accelerometer 426, a magnetometer, and/or a gyroscope effective to measure motion and/or trajectory data of the stylus. In various examples, motion and/or trajectory data may be sent to the mobile device 405 from the stylus 425 via a Bluetooth communications channel 440.

In some examples, the mobile device 105 includes a Hall sensor 465 and the stylus 425 includes a magnet 470. If the stylus is in a physical proximity of the mobile device such that the magnet 470 activates the Hall sensor 465, the stylus and/or the mobile device may initiate an attach-to-pair process that establishes the Bluetooth communications channel between the stylus and the mobile device. Furthermore, if the magnet activates the Hall sensor 465 and the attach-to-pair process is already complete, the stylus may not send trajectory data to the mobile device. In other examples, the mobile device 105 may include a magnet that activates a Hall sensor on the stylus 425 such that the stylus initiates an attach-to-pair process.

In at least one example, the Bluetooth controller 450 interacts with the touch controller 420 via an electronic communications interface or electronic signal path 455. The electronic signal path 455 between the touch controller 420 and the Bluetooth controller 450 may be a dedicated electronic signal path. A dedicated electronic signal path may be used to send a power-on signal and/or a power-off signal from the Bluetooth controller to the touch controller, and/or may be used to perform various operations associated with a method of power-saving disclosed herein. The Bluetooth controller may, via the dedicated electronic signal path, toggle a power state and/or a sleep state and/or a working state of the touch controller without intervention of the CPU and/or SoC. A dedicated signal path may include a single electrical conductor and/or a minimal-pin interface. A dedicated signal path may be characterized by low-power electrical specifications and may include a level-shifting and/or voltage-shifting electrical circuit to match level and/or voltage domains of the Bluetooth chipset 445 and/or the Bluetooth controller 450 and the touch controller 420. In some examples, in an instance where the Bluetooth controller does not send a power-on signal to the touch controller via the signal path 455, the touch controller may not send a short-range wireless connection beacon. The Bluetooth controller may not send a power-on signal to the touch controller in an instance where the mobile device is already fully awake. For example, a user may not own a stylus and/or may power on the mobile device manually by pressing a power button.

In many examples, the Bluetooth controller 450 may maintain the Bluetooth communications channel 440 and/or the Bluetooth transceiver 435 in a low-power state. In some examples, a mobile device may include a low-power rail that powers the Bluetooth chipset 445.

Figure 5:
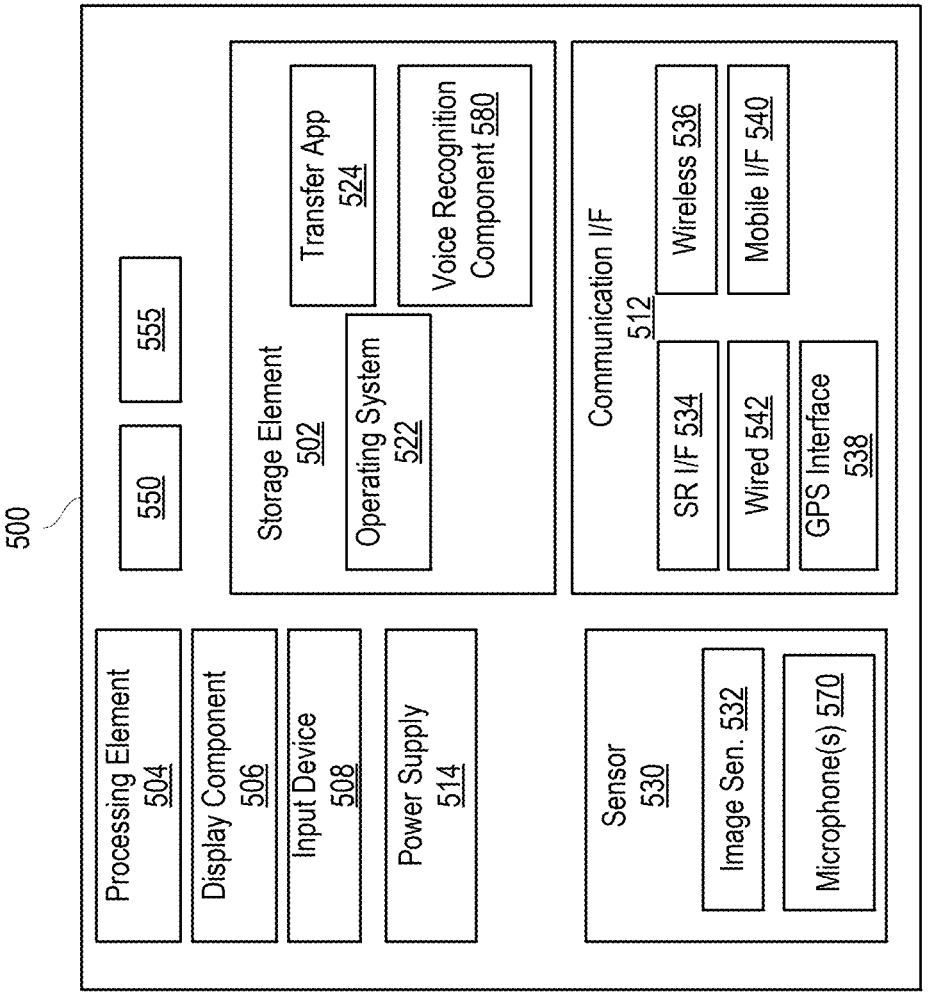
FIG. 5 depicts an example device effective to perform a method of power saving of a stylus and a mobile device in accordance with various aspects of the present disclosure.

FIG. 5 depicts an example device 500 capable of receiving digital handwriting as input, performing a digital handwriting enhancement process for displays, and/or performing a font-matching process. It will be appreciated that not all devices will include all of the components of the example device 500 and some user devices may include additional components not shown in the example device 500. The example device 500 may include one or more processing elements 504 for executing instructions and retrieving data stored in a storage element 502. Data stored in a storage element may include instructions for a processing element, digital fonts, image processing routines or libraries, or other data. The processing element 504 may comprise at least one processor. Any suitable processor or processors may be used. For example, the processing element 504 may comprise one or more digital signal processors (DSPs) or graphics processing units (GPUs), machine learning (ML) accelerator units, tensor processing units (TPUs), application-specific integrated circuits (ASICs), and/or various other processors or coproccesors. In some examples, the processing element 504 may be effective to determine a wakeword and/or to stream audio data to a speech processing system.

In various examples, the storage element 502 can include one or more different types of memory, data storage, or computer-readable storage media devoted to different purposes within the example device 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and/or commands between applications executing on the device 500 and various hardware thereof. A transfer application 524 may be configured to receive images, audio, and/or video from another device (e.g., a mobile device, image capture device, and/or display device) or from an image sensor 532 and/or microphone 570 included in the example device 500. In some examples, the transfer application 524 may also be configured to send the received voice requests to one or more voice recognition servers.

When implemented in some user devices, the example device 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device. In some examples, the display component 506 and/or one or more speakers (not shown) may be effective to output an indication that unconsumed notifications (e.g., voice notifications) are pending. In some cases, there may be an indicator light effective to provide such an indication. In addition, speakers of the example device 500 may output the voice notification audio upon receiving a user command to consume or "read" the voice notifications.

Touchscreen technology encompasses several types, including resistive, capacitive, infrared, and multi-touch screens. Resistive touchscreens use pressure, capacitive screens rely on electrical charges, and infrared screens detect touch using infrared light. Multi-touch screens can detect multiple points of contact simultaneously. A resistive touch-screen may consist of two flexible sheets, separated by a small gap, that are coated with a thin conductive layer. When touched, the pressure brings the layers into contact, creating a signal. A capacitive touchscreen may utilize a slight electrical conductivity of human skin to detect touch. A capacitive touchscreen may use a conductive layer on the surface of the screen and, when a finger or conductive stylus makes contact, the contact may induce an electric field, allowing the system to detect the touch. Infrared touch-screens may employ a grid of infrared light sources and sensors around the edges of the screen. When a finger or stylus breaks the infrared beams, the sensors detect the touch.

The display component 506 may be any display, such as a liquid crystal display (LCD), a light-emitting diode (LED) or organic LED (OLED) display, a cathode ray tube (CRT), or other display. In some examples, the display component 506 may be an electrophoretic display or an "e-paper" display. An electrophoretic display may manipulate or move electrically-charged pigment particles suspended in a fluid within microcapsules or microcells. A microcapsule may contain dark and light pigment particles with opposite electrical charges. Under an applied electric field, charged pigment particles migrate to a top or a bottom of a capsule such that the capsule appears light or dark to a viewer.

The example device 500 may also include one or more input devices 508 operable to receive inputs from a user. The input devices 508 can include, for example, a stylus, a push button, touch pad, touch screen, wheel, joystick, keyboard, mouse, trackball, keypad, light gun, game controller, or any other such device or element whereby a user can provide inputs to the example device 500. These input devices 508 may be incorporated into the example device 500 or oper-ably coupled to the example device 500 via wired or wireless interface. When the display component 506 includes a touch-sensitive display, the input devices 508 can include a touch sensor that operates in conjunction with the display component 506 to permit users to interact with the image displayed by the display component 506 using touch inputs (e.g., with a finger or stylus). A stylus may be powered or unpowered. An unpowered stylus may interact with a capacitive touchscreen or display. A powered stylus may include internal electrical or computational components that interact with the display component 506 or other component of the example device 500. A powered stylus may be sensitive to applied pressure or to a tilt or angle of operation.

In some examples, example device 500 may include a microphone 570 or an array of microphones for capturing sounds, such as voice requests. Voice recognition compo-nent 580 may interpret audio signals of sound captured by microphone 570. In some examples, voice recognition com-ponent 580 may listen for a "wakeword" to be received by microphone 570. Upon receipt of the wakeword, voice recognition component 580 may stream audio to a voice recognition server for analysis, such as a speech processing system. In various examples, voice recognition component

580 may stream audio to external computing devices via communication interface 512.

The example device 500 may also include a power supply 514, such as a wired alternating current (AC) converter, a rechargeable battery operable to be recharged through con-ventional plug-in approaches, or through other approaches such as capacitive or inductive charging.

The communication interface 512 may comprise one or more wired or wireless components operable to communi-cate with one or more other computing devices. For example, the communication interface 512 may comprise a wireless communication module 536 configured to commu-nicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field commu-nications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable posi-tion-determining systems to identify a position of the example device 500. A wired communication module 542 may be configured to communicate according to the USB protocol or any other suitable protocol.

The example device 500 may also include one or more sensors 530 such as, for example, one or more position sensors, image sensors, and/or motion sensors. An image sensor 532 is shown in FIG. 5. An example of an image sensor 532 may be a camera configured to capture color information, image geometry information, and/or ambient light information.

The example device 500 may also include a touch con-troller 550 and a Bluetooth module 555. A touch controller may mediate user input from a stylus and may be effective to send short-range wireless connection beacons and/or receive acknowledgement data responsive to such beacons. A Bluetooth module may receive motion or trajectory data from a stylus.

Although various systems described herein may be embodied in software or code executed by general purpose hardware as discussed above, as an alternate the same may also be embodied in dedicated hardware or a combination of software/general purpose hardware and/or dedicated hard-ware. If embodied in dedicated hardware, each can be implemented as a circuit or state machine that employs any one of or a combination of a number of technologies. These technologies may include, but are not limited to, discrete logic circuits having logic gates for implementing various logic functions upon applying one or more data signals, application specific integrated circuits having appropriate logic gates, or other components, etc. Such technologies are generally well known by those of ordinary skill in the art and consequently, are not described in detail herein.

As used herein (e.g., including in the claims of the application), the terms "first", "second", and so forth, do not necessarily imply a particular order of events or elements, but are used to distinguish individual elements from one another. For example, the language a "first layer" of a machine learning model does not necessarily mean that the layer is the initial layer of the model. Instead, the adjective "first" may merely be intended to distinguish the layer from other layers such as a "second" layer. In fact, in various examples, the second layer may precede the first layer and there may be any number of intervening layers between the "first layer" and the "second layer."

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some examples, one or more of the blocks or steps may be skipped or omitted. It is understood that all such variations are within the scope of the present disclosure.

Also, any logic or other type of application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

determining that a motion of a stylus has occurred;

transmitting, from the stylus to a wireless transceiver circuit on a mobile device, a notification of the motion of the stylus;

transmitting, from the wireless transceiver circuit to a touch controller circuit on the mobile device, a power-on signal;

transitioning the touch controller circuit from a low-power state to a working state;

transmitting, from the touch controller circuit, a short-range wireless connection beacon;

receiving, at the touch controller circuit, in an instance where the stylus is within atouch downlink distance of the touch controller circuit, a response from the stylus to the short-range wireless connection beacon;

transitioning a primary processor of the mobile device from a sleep state to a wake state in response to receiving the response from the stylus to the short-range wireless connection beacon; and receiving, at the mobile device from the stylus, stylus data.

2. The method of claim 1 comprising:

ceasing, in an instance where the stylus is at a distance greater than the touch downlink distance of the touch controller circuit for a first timeout duration, the transmitting of the short-range wireless connection beacon; and transitioning the touch controller circuit from a working state to a low-power state.

3. The method of claim 1 comprising:

rendering, by the primary processor on a display of the mobile device and based on the stylus data, output data.

4. The method of claim 1 comprising:

a transmitting, from the wireless transceiver circuit to a touch controller circuit on the mobile device, a power-on signal in a dedicated electronic signal path from the wireless transceiver circuit to a touch controller circuit.

5. A method comprising:

determining, by a mobile device, that motion of an input device has occurred;

sending, based on the determining of the motion of the input device, a power-on signal to a touch controller circuit;

sending a first wireless connection beacon using a short-range wireless communication protocol;

receiving acknowledgement data responsive to the wireless connection beacon from the input device;

sending, in an instance where a central processing unit (CPU) is in a low-power state, a power-on signal to the CPU in response to receiving the acknowledgement data from the input device to the short-range wireless connection beacon; and receiving, using the short-range wireless communication protocol, input data associated with an interaction of the input device with a display of the mobile device.

6. The method of claim 5 comprising:

sending, based at least in part on the acknowledgement data, the power-on signal to the CPU of the mobile device.

7. The method of claim 5 comprising:

sending, based on a manual action of a user, the power-on signal to the CPU of the mobile device.

8. The method of claim 5 wherein the sending of the power-on signal to the touch controller circuit occurs from a wireless transceiver circuit and in a dedicated electronic signal path to the touch controller circuit.

9. The method of claim 5 comprising:

ceasing, in an instance where the input device is at a distance greater than a touch downlink distance of the touch controller circuit for a first timeout duration, the sending of the first wireless connection beacon using the short-range wireless communication protocol; and sending a power-off signal to the touch controller circuit.

10. The method of claim 9 comprising:

sending a second wireless connection beacon using the short-range wireless communication protocol;

sending, in an instance where no acknowledgement data responsive to the second wireless connection beacon is received from the input device within a second timeout duration, a power-off signal to the CPU.

11. The method of claim 5 comprising:

receiving, by a wireless transceiver circuit, trajectory data from the input device; and determining, based on the trajectory data, that the motion of the input device has occurred.

12. The method of claim 5 comprising:

controlling, by the CPU, a display of the mobile device to render output data based on the input data.

13. A system comprising:

a mobile device, comprising:

at least one processor;

a short-range wireless transceiver;

a display;

a touch controller circuit; and non-transitory computer-readable memory storing instructions that, when executed by the at least one processor are effective to:

determine that motion of an input device has occurred;

send, based on the determination of the motion of the input device, a power-on signal to the touch controller circuit;

send a wireless connection beacon using a short-range wireless communication protocol and the short-range wireless transceiver;

receive, by the short-range wireless transceiver, acknowledgement data responsive to the wireless connection beacon from the input device;

send, in an instance where a central processing unit (CPU) of the mobile device is in a low-power state, a power-on signal to the CPU in response to receiving the acknowledgement data from the input device to the short-range wireless connection beacon; and receive, by the short-range wireless transceiver, input data associated with an interaction of the input device with the display.

14. The system of claim 13, wherein the mobile device comprises:

an electronic signal path from the short-range wireless transceiver to the touch controller circuit dedicated to sending, based on the determination of the motion of the input device, a power-on signal to the touch controller circuit.

15. The system of claim 13 wherein the instructions, when executed by the at least one processor, are effective to:

render, on the display and based on the input data, output data.

16. The system of claim 13, wherein the instructions, when executed by the at least one processor, are effective to:

cease, in an instance where the input device is at a distance greater than a touch downlink distance of the touch controller circuit for a first timeout duration, sending of the wireless connection beacon using the short-range wireless communication protocol; and send a power-off signal to the touch controller circuit.

17. The system of claim 13, wherein the mobile device comprises a wireless transceiver circuit and wherein a determination that a motion of the input device has occurred is based on trajectory data of the input device received by the wireless transceiver circuit.

18. The system of claim 13, wherein the instructions, when executed by the at least one processor, are effective to:

send, in an instance where no input data is received by the touch controller circuit within a second timeout duration, a power-off signal to the CPU.

19. The system of claim 13 wherein the instructions, when executed by the at least one processor, are effective to:

send, based at least in part on the acknowledgement data, a power-on signal to the CPU.

20. The system of claim 13 comprising:

a stylus wherein the stylus is effective to:

receive a wireless connection beacon; and send, based on the wireless connection beacon, acknowledgement data effective to transition the CPU from a low-power state to a working state.

* * * * *